United States Patent [19]

Shirato et al.

[11] Patent Number: 4,717,486
[45] Date of Patent: Jan. 5, 1988

[54] METHOD OF FILTERING SUSPENSION

[75] Inventors: Monpei Shirato; Eiji Iritani; Aisaburo Yagishita; Kazuhiko Yagishita, all of Nagoya, Japan

[73] Assignee: Kabushiki Kaisha Sanshin Seisakusho, Japan

[21] Appl. No.: 912,426

[22] Filed: Sep. 26, 1986

[30] Foreign Application Priority Data

Feb. 28, 1986 [JP] Japan .................. 61-041393

[51] Int. Cl.$^4$ ............................................. B01D 35/20
[52] U.S. Cl. ...................................... 210/785; 210/388
[58] Field of Search ............... 210/785, 748, 780, 388, 210/389

[56] References Cited

U.S. PATENT DOCUMENTS

| | | | |
|---|---|---|---|
| 3,463,727 | 8/1969 | Fahey | 210/78 S |
| 3,933,648 | 1/1976 | Urayama | 210/388 X |
| 4,028,232 | 6/1977 | Wallis | 210/78 S |
| 4,039,456 | 8/1977 | Stoev et al. | 210/388 |
| 4,184,965 | 1/1980 | Stoev et al. | 210/388 |
| 4,346,011 | 8/1982 | Brownstein | 210/78 S X |

Primary Examiner—Tom Wyse
Attorney, Agent, or Firm—Lowe, Price, LeBlanc, Becker & Shur

[57] ABSTRACT

In a method of filtering and condensing a suspension containing a solid suspended substance, the improvement comprising the step of vibrating a board member provided in the suspension in opposed relation with a filtration surface in a direction parallel to the filtration surface. The board member is provided at a distance of preferably 10 mm or less from the filtration surface.

2 Claims, 2 Drawing Figures ical # 4,717,486

METHOD OF FILTERING SUSPENSION

BACKGROUND OF THE INVENTION

The present invention relates to a method of filtering a suspension to efficiently recover a liquid medium and obtain a condensed suspension.

Various filtration methods are used in filtering a suspension to recover a liquid medium. In the case of using of a filter material having a high density so as to carry out highly accurate filtration where a suspended substance is prevented from being leaked out to a filtrate, there will arise a problem that filtration efficiency is reduced in association with deposition of a cake on a filtration surface. To cope with this problem, there has been proposed a vibration filtration method for efficiently achieving concentration of the suspension and recovery of the filtrate, by preventing deposition of the cake on the filtration surface to thereby continuously conduct the filtration for a long period of time.

In such a conventional vibration filtration method as mentioned above, while a filtration operation is carried out by applying vibration to a filter equipment as a whole, deposition of the cake cannot be completely prevented, and furthermore, fastened portions of the filter equipment are loosened. Furthermore, there has been proposed an improved method of filtering a liquid by applying vibration to a filter material or its associated parts only, so as to prevent deposition of the cake on the filter material (Japanese Patent Publication No. 58-27972).

In the conventional filtration methods as mentioned above, while a rate of deposition of the cake onto the filter material may be reduced, it is necessary to reinforce the filter equipment or its associated parts to which vibration is applied, so as to endure the vibration. As a result, weight is increased to reduce energy efficiency, and the filter material is easily damaged by fatigue.

SUMMARY OF THE INVENTION

It is a primary object of the present invention to provide a method of filtering a suspension, which may prevent a cake from being deposited on a filtration surface and recover a filtrate only from the suspension for a long period of time with a high accuracy.

It is another object of the present invention to provide a method of filtering a suspension, which may increase a yield of a filtrate per unit operation time.

It is a further object of the present invention to provide a method of filtering a suspension, which may reduce energy consumption and any troubles of a filter apparatus and a filter material to ensure a long life.

According to the present invention, the method of filtering a suspension containing a solid suspended substance is characterized in that a board member is provided in the suspension in opposed relation with a filtration surface, and is vibrated in a direction parallel to the filtration surface. Particularly, a distance between the board member and the filtration surface is set to preferably 10 mm or less.

A filter material provided in the filter apparatus to be used in the present invention is preferably fixed, and the filtration surface is preferably plane or cylindrical. The board member arranged opposite to the filtration surface has a shape such that the board member may be opposed to the filtration surface at a substantially uniform distance. Therefore, the board member is preferably plane or cylindrical in correspondence with the shape of the filtration surface. The opposite surface of the board member to the filtration surface is not necessarily smooth, but it may be a rough surface having fine unevenness, or it may be formed with projections or grooves. A back surface of the board member is formed in an appropriate shape, and it may be arranged opposite to the adjacent filtration surface. In this case, the board member may be formed with a through-hole leading from the opposite surface to the back surface. Further, in the case that the board member includes a passage for communicating the suspension to be condensed, the suspension may be condensed more efficiently.

The distance between the board member and the filtration surface is preferably 10 mm or less. If the distance is too large, the efficiency of condensation of the suspension is less improved. In contrast, if the distance is too small, the filtration surface is injured during vibration of the board member, and the suspension is insufficiently diffused and circulated, causing reduction in treatment efficiency. Therefore, the distance is preferably set to a suitable value in consideration of a dimensional accuracy of the filtration surface and the board member.

Vibration conditions of the board member in the present invention are not especially limited. However, if a frequency is too small, and an amplitude is too small, the effect of the present invention is less obtained. In contrast, if the frequency is too high, and the amplitude is too large, the quantity of energy consumption becomes greater than the effect. Therefore, it is preferred to select suitable conditions according to the apparatus used in the present invention and property of the suspension as an object to be condensed.

Other objects and features of the invention will be more fully understood from the following detailed description and appended claims when taken with the accompaning drawings.

DETAILED DESCRIPTION OF THE PREFERRED EMBODIMENTS (Reference)

Figure 1:
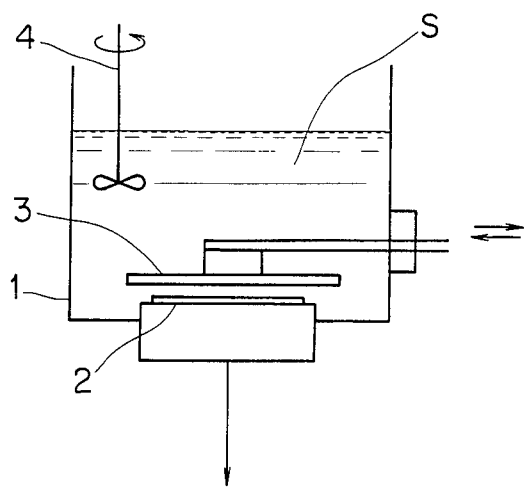
FIG. 1 is an illustration of an experimental equipment for embodying the method of filtering the suspension according to the present invention.

As shown in FIG. 1, a flat filter cloth 2 having a filtration area of 25 cm$^2$ was horizontally arranged at a bottom portion of a filter tank 1. In the filter tank 1, 20 wt. % aq. dispersion S of Korean Kaolin was poured. Then, pressure on a lower side of the filter cloth 2 was reduced while the aq. dispersion S was being stirred by means of a stirrer 4. As the result, an amount of filtrate relative to a filtration time was measured, and a filtration velocity was calculated.

When the filtration was continued under a reduced pressure of 36 kPa without vibrating a vibration plate 3, a cake was deposited on the filter cloth 2 as the filtration time was elapsed, and the filtration velocity was gradually reduced. Then, a total amount (cm) of the filtrate having passed through the filter cloth per unit filtration area was compared with an inverse of the filtration velocity, that is, a filtration resistance (min/cm) to obtain a proportional relation as shown by (I) in FIG. 2.

(EXAMPLE 1)

With use of the apparatus in Reference, a vibration plate 3 was provided over the filtration surface of the filter material in parallel relation therewith. The vibration plate 3 was formed by a plane board having a surface larger than the filtration surface. The distance between the filtration surface and the vibration plate was set to 1.5 mm. Similar to Reference, 20 wt. % aq. dispersion of Korean Kaolin was filtered with the vibration plate 3 being vibrated at a vibration frequency of 8 sec$^{-1}$ and an amplitude of 5 mm.

Figure 2:
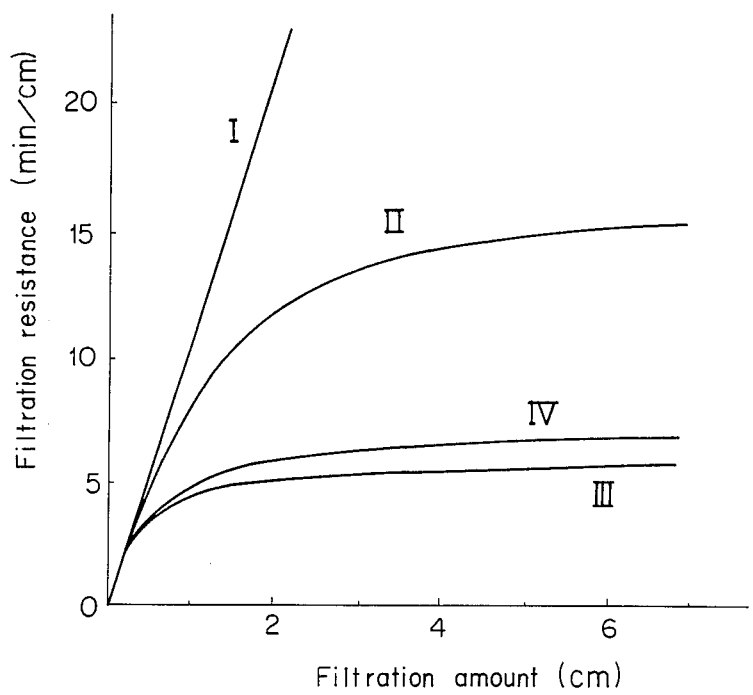
FIG. 2 is a graph showing the relation between a total amount of the filtrate passing through the filtration surface per unit area and a filtration resistance in filtering the suspension.

A filtrate was completely transparent, and the relation between the total amount of the filtrate having passed through the filter cloth per unit area and the filtration resistance is shown by (II) in FIG. 2. As is apparent from the result, the filtration resistance is saturated near 15 min/cm, and even if the filtration is continued, an amount of the cake deposited is not increased, and filtration efficiency is not reduced.

(EXAMPLE 2)

The vibration plate 3 was formed by a board member having a surface larger than filtration surface of the filter material, the board member being formed with plural sectionally square projections each having a width of 2 mm and a height of 2 mm, and arranged at intervals of 20 mm on its opposite surface to the filtration surface. The distance between the filtration surface and the top of the projections was set to 1.3 mm. Then, the filtration was carried out under the same conditions as in Example 1 except the vibration frequency of 23 sec$^{-1}$ and the amplitude of 5 mm.

The result of the filtration is shown by (III) in FIG. 2, and it is appreciated that the filtration resistance is not increased over about 6 min/cm.

(EXAMPLE 3)

The vibration plate 3 was formed by a board member having a surface larger than the filtration surface of the filter material, the board member being formed with plural sectionally square grooves each having a width of 2 mm and a depth of 2 mm, and arranged at intervals of 20 mm on its opposite surface to the filtration surface. The distance between the filtration surface and the opposite surface was set to 1.5 mm. The filtration was carried out under the same conditions as in Example 1 except the vibration frequency of 30 sec$^{-1}$ and the amplitude of 5 mm.

The result of the filtration is shown by (IV) in FIG. 2, and it is appreciated that the filtration resistance is not increased over about 7 min/cm.

What is claimed is:

1. A method of filtering and condensing a liquid suspension containing a solid suspended substance, comprising the steps of: providing a chamber having an outlet in the lower portion thereof for containing said suspension; providing a filter across the outlet to said chamber; providing a flat board member disposed within said chamber and contained within a plane parallel to the plane containing said filter surface and spaced adjacent thereto; and vibrating said board member in said suspension in opposed relation with said filter surface in a direction parallel to said filter surface.

2. The method as defined in claim 1, wherein said board member is spaced at a distance of no more than 10 mm from said filter surface.

* * * * *